Nov. 24, 1953  H. F. COFFEY ET AL  2,660,336
FILLING DEVICE
Filed April 10, 1948  2 Sheets-Sheet 1
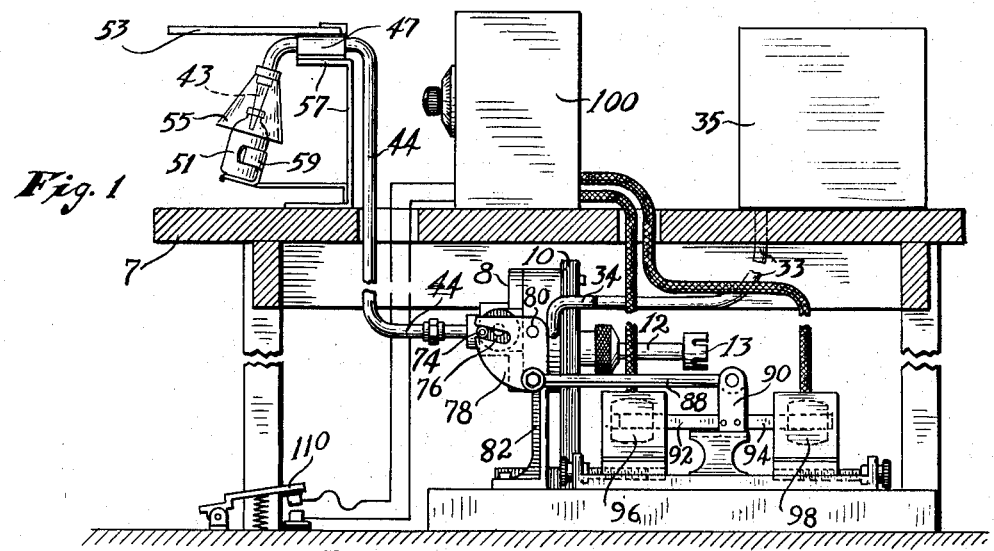
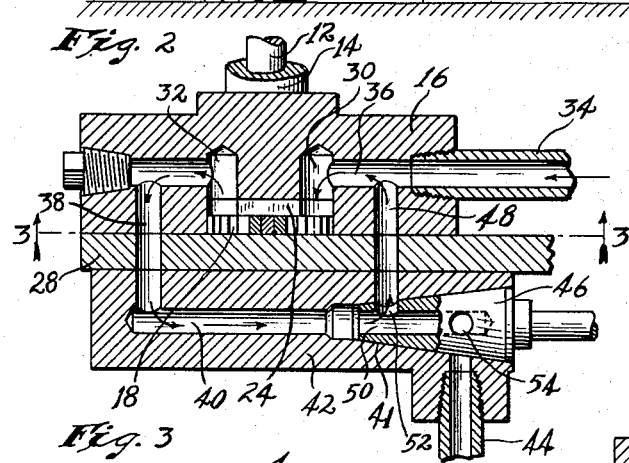
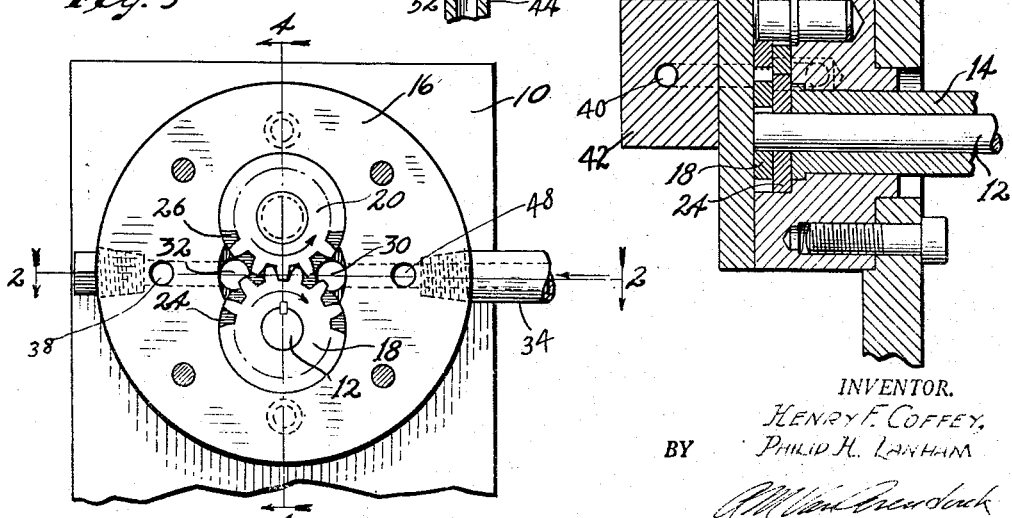
INVENTOR.
HENRY F. COFFEY.
PHILIP H. LANHAM
BY
ATTORNEY.

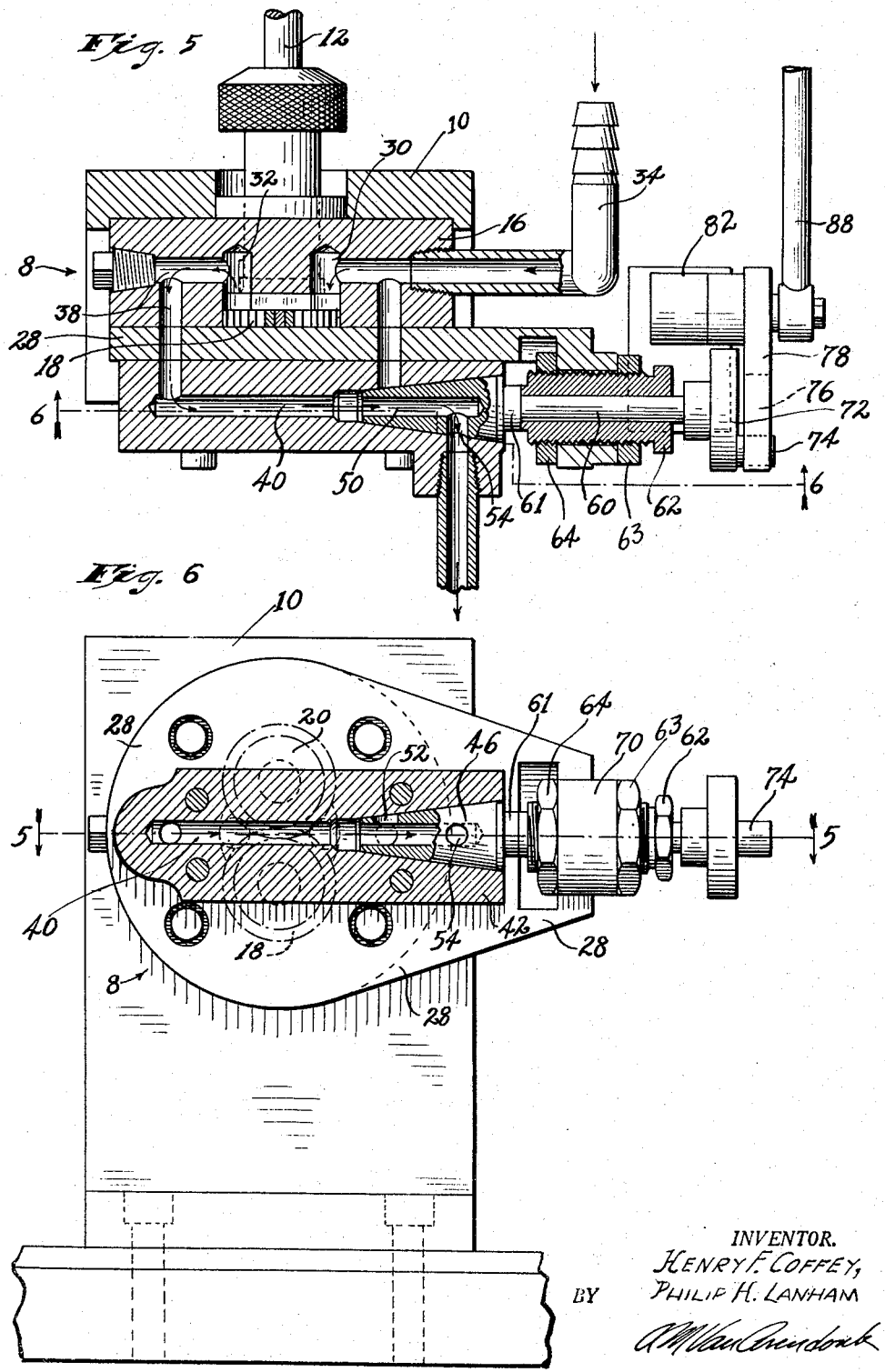

Patented Nov. 24, 1953

2,660,336

UNITED STATES PATENT OFFICE 2,660,336

FILLING DEVICE

Henry F. Coffey and Philip H. Lanham, Indianapolis, Ind., assignors to Eli Lilly and Company, Indianapolis, Ind., a corporation of Indiana Application April 10, 1948, Serial No. 20,275

6 Claims. (Cl. 222—70)

This invention relates to apparatus for delivering accurate and uniform predetermined measured amounts of a liquid, especially exact small amounts of a viscous liquid. The invention is of special usefulness and advantage in filling vials with uniform small amounts of medicinal substances, particularly suspensions of a medicament such as penicillin in an oil or oil and wax carrier.

In filling medicinal vials, as with an oil suspension of penicillin, many factors impose exacting requirements for accuracy in the amounts which are filled into the vials. The active substances are highly expensive, and the vials must contain amounts greater than a predetermined minimum so that the full dosage may be withdrawn from the vial. Heretofore, because of the inaccuracies in filling procedures, it has been necessary to fill the vials with substantially excessive amounts, so that errors in filling would produce no vials containing less than a predetermined minimum amount. Inaccuracies in filling arose from the practical desideratum of rapid operation, and from inherent difficulties of handling and measuring viscous opaque material. For example, one standard filling procedure has been to draw the material into a measured cylinder by withdrawing a piston in that cylinder and then to eject the contained material into the vial. But with a viscous material, such as a penicillin oil suspension, this procedure has proved both too slow and too inaccurate. While ejection of the material could be done forcibly, drawing the material into the cylinder was unavoidably slow. Efforts to increase speed caused air to be drawn into the measuring cylinder, where its expansion and contraction during operation greatly increased the error produced, and the error was augmented as the air accumulated in the cylinder. Thus, the prior filling practices required a wasteful allowance for error, were unreliable, were slow, and increased the cost of the finished product.

It is the primary object of this invention to provide apparatus which will discharge a liquid material in highly accurate measured amounts of predetermined but adjustable quantity, which will produce a rapid forcible discharge and will regularly repeat such discharges in rapid succession, so that the margin of error which must be allowed in predetermining the amounts to be filled is substantailly reduced and the filling operations are increased in speed, thereby greatly increasing the output of filled vials. It is a further object of my invention to provide such a filling apparatus which may readily and conveniently be sterilized to prevent contamination of the material to be filled.

In accordance with this invention, the material to be filled is recirculated in a constant stream, that is, a substantially non-pulsating stream moving at a substantially uniform rate, through a confined circuit by a pump which provides continuous and positive movement of the material through that circuit, and the material is diverted therefrom to produce a forcible discharge from a filling nozzle during spaced periods of accurately predetermined length. The positive movement of the stream of material conveniently is obtained with a gear pump, and we prefer to use a gear pump, especially with suspensions, because of the desirable mixing effect of a gear pump; but other positive-displacement, non-pulsating pumps may be used. The recirculation passages desirably impose little back pressure, to avoid heating and consequent variation in viscosity. The diversion of the solid stream of material to the nozzle desirably is effected by rapid movement of a non-displacing valve which shifts the stream from the recirculating passage to the discharge nozzle for the predetermined period. The high speed shifting of the valve desirably is obtained by electrical actuation, and accurate timing is desirably obtained by electronic timing controls of the valve actuating circuits. By this means, the possibility of entraining air in the stream of material to the filling nozzle is eliminated, and the viscous material may be discharged from the nozzle under pressure, to complete each filling operation in a minimum time. The accuracy and uniformity of the amounts of material filled is thus made extremely high, and the speed of filling is greatly increased.

The accompanying drawings illustrate my invention: Fig. 1 is a side elevation of filling apparatus embodying my invention, with the supporting table shown in section. Fig. 2 is a horizontal section through the pump employed in the apparatus of Fig. 1, taken on the line 2—2 of Fig. 3, and showing the valve in recirculating position. Fig. 3 is a vertical section taken on the line 3—3 of Fig. 2, in a plane of separation of the pump. Fig. 4 is a vertical section at right angles to that of Fig. 3 and taken on the line of 4—4 of Fig. 3. Fig. 5 is a horizontal section similar to that of Fig. 2, taken on the line 5—5 of Fig. 6, and showing the valve in filling position and showing additional parts of the pump operating and valve operating connections. Fig.

6 is a vertical section through the valve block, taken on the line 6—6 of Fig. 5.

The apparatus shown in the drawings comprises a supporting table 7 having a filling station at its front (to the left in Fig. 1). A reservoir or supply tank 35, desirably fitted with an agitator, is supported on the table 7 and feeds by gravity through a tube 33 to the gear pump housing generally indicated at 8, said housing being mounted below the table. The material enters the pump through an inlet nipple 34 separably connected to the tube 33 from the supply tank 35. The pump body 16 provides an inlet passage 36 leading to an intake chamber 30 to supply the pump formed by the gears 18 and 20. A gear chamber in the pump body 16 closely fits about the circumference of the gears 18 and 20; but the depth of such chamber is desirably substantially greater than the thickness of the gears, and filler blocks 24 and 26 are positioned against the side of the gears 18 and 20, so that the capacity of the pump can be readily changed simply by replacing the gears and filler blocks with corresponding parts of different thicknesses. Opposite the intake chamber 30, the pump block 16 is bored to provide a delivery chamber 32 and an outlet passage 38. A by-pass 48 is drilled in the pump block 16 in communication with the intake passage 36. The pump is closed by a plate 28, which is drilled to provide continuations of the outlet passage 38 and by-pass 48, and a valve block 42 is secured against the outer face of the plate 28. The valve block has passages aligned with the outlet passage 38 and the by-pass 48, and a longitudinal passage 40 communicating with the outlet passage 38 and leading to a conical valve seat 41. A conical valve 46 received in the seat 41 has a longitudinal bore 50 in open communication with the passage 40 and provides lateral ports 52 and 54 leading from the longitudinal bore 50. The port 52 is positioned (in Fig. 2) to be aligned with the by-pass 48, and the port 54 is positioned so that upon 90° rotation of the valve 46 from by-pass position the port 54 will be aligned with a delivery passage leading to a delivery conduit 44. Desirably, the ports are so positioned and of such size that one begins to open before the other closes, to avoid even an instantaneous complete closing of the valve against flow of the constantly moving stream of material.

The pump body 16 is removably supported on a wall 10 having a suitable opening to pass the bearing 14 of the shaft 12 by which the pump is rotated. The outer end of the shaft 12 is connected to a separable coupling member 13 through which it may be driven, as by a suitable electric motor and gear reduction, say at a speed of about 350 R. P. M.

The delivery conduit 44 desirably contains a separable union, and leads from the pump upwardly to a support 47 on a bracket 57 at the delivery station, where it is connected to a discharge nozzle 43, desirably one having a restricted discharge opening. Preferably, the discharge nozzle is protected from airborne contamination by an overlying glass plate 53 and a conical shield 55. A bracket 59 forms a seat below the nozzle 43 for supporting a bottle 51 in position to receive the nozzle 43 within its mouth.

As is shown in Figs. 5 and 6, the stem 60 of the valve 46 is mounted in an axially adjustable sleeve 62 which bears against a collar 61 at the outer end of the valve 46, the sleeve being mounted by nuts 63 and 64 in a bracket 70 carried by the pump closing plate 28. The outer end of the valve stem 60 carries an eccentric 74 which is operably received in a slot 76 of a rock plate 78 pivoted on a pin 80 supported on a fixed standard 82. The rock plate 78 is connected by a link 88 to a reciprocable slide 90 driven by the movable cores 92 and 94 of opposed solenoids 96 and 98. As shown in Figs. 1, 5, and 6, the valve is in discharge position, with its discharge port 54 positioned to deliver the stream of material to the conduit 44 and therethrough to the nozzle 43 to fill the bottle 51. The valve-operating eccentric 74 and the rock plate 78 are in their extreme positions of movement counterclockwise (Fig. 1), the link 88 and the slide 90 are in their extreme positions of movement to the right, and the solenoid core 94 is retracted into its solenoid 98. From these positions, actutaion of the opposed solenoid 96 retracts its core 92 to move the slide 90 to the left, which drives the link 88 to the left to rock the plate 78 clockwise, and this rotates the valve clockwise to the by-pass position shown in Fig. 2. Subsequent actuation of the solenoid 98 returns the parts to the positions shown in Figs. 1, 5, and 6.

The two solenoids are connected to a power source through electrical timing mechanism 100 which energizes the solenoids at accurately related times, to produce in sequence an actuation of the solenoid 98 and a consequent rapid movement of the valve to delivery position, a dwell of predetermined length during which liquid is discharged into a bottle 51, an actuation of the solenoid 96 and a consequent rapid reverse movement of the valve to by-pass position, a dwell during which the material recirculates through the pump by way of the by-pass 48 and the full bottle 51 is replaced by an empty bottle 51, then a reactuation of the solenoid 98 and repetition of the sequence of operations. The timing mechanism 100 herein disclosed is of an electronic type. It will be understood, of course, that any one of several commercially available timers of this character may be employed for initiating the actuation of solenoids 96 and 98 at appropriate time intervals or that, if desired, mechanical or electric motor controlled timing mechanism could be used in place of such electronic timer mechanism.

The dwell during which the bottle 51 is replaced may be operator controlled, but preferably is of predetermined timed length. A control switch 110, conveniently foot operated, is connected to the timer so that the filling operations may be interrupted and maintained out of operation until resumption is desired; and such switch and timer are so related that the cycle of operations will be interrupted only during a bottle-replacement dwell. Such interruption at this point in the cycle leaves the valve in by-pass position so that the material continues to recirculate through the pump during the interruption.

Operation of the filling apparatus, as applied for example to filling 10 cc. vials, is as follows: The pump 8 is unbolted from the support 10, the drive shaft separates from its drive at the separable coupling 13, and the valve eccentric slips out of the slot 76, to permit removal of the pump together with its supply nipple 34, delivery conduit 44, and the nozzle 43. These parts are sterilized, as with heat, and reassembled in sterile condition. A filled supply tank is put in place, and connected to the intake nipple 34 of the pump. The pump is then operated to fill itself and the delivery conduit and nozzle with filling material and to displace air from the circuit.

With the valve in by-pass position, the operation is then put under the control of the timer 100. The filling material forms an unbroken column from the supply tank 35 to the pump 8, and from the pump 8 to the nozzle 43, and the pump is positively recirculating an unbroken stream of material through the delivery passage 38, the valve-block passage 40, the valve bore 50, the port 52, the by-pass 48, and the intake passage 36 to the intake side of the pump. The operator inserts a bottle 51 in the seat 59 and operates the switch 110 to start the filling operations.

The timer actuates the solenoid 98, which moves the valve to delivery position, to close off the by-pass 48 and divert the positively moving unbroken stream to the delivery conduit 44 and nozzle 43, and a forcible discharge from the nozzle 43 into the bottle 51 starts immediately. Such delivery continues for a predetermined time, 1.3 seconds in the case of one installation, during which the bottle is filled, in such case with precisely 12 cc. of material. The timer now actuates the solenoid 96, which promptly and rapidly moves the valve to by-pass position and shuts off the valve-end of the delivery conduit 44. This halts the flow of material in the conduit 44 and cleanly cuts off the discharge at the restricted opening of the nozzle 43.

A dwell now occurs during which the operator removes the filled vial, and replaces it with an empty one. Preferably this dwell is determined by the timer, and in the installation referred to, the timer gives a dwell of 2.7 seconds, and the operator not only replaces the filled bottle but also caps the filled bottle. During such dwell, the valve is in by-pass position, and the pump is recirculating a solid stream of material as before. The timer now actuates the solenoid 98 again to divert the positively moving stream of material to the delivery conduit 44, to produce a forcible discharge from the nozzle 43 to fill the second vial 51. The sequence of operations continues repeatedly, to fill vials 51 at the rate of one every four seconds, with the actual filling requiring 1.3 seconds and with 2.7 seconds allowed for replacement of the filled vials, and with the operator capping the filled vials during that part of the 4-second cycle not occupied by actual vial replacing operations.

It will be understood that if desired, conduit 44 may be flexible and discharge nozzle 43 detachably mounted upon bracket 57, so that the nozzle may be removed by the operator, and brought successively into filling association with each of a plurality of vials contained in a tray or the like, and the filling operations performed in this manner. In such event, it will also be understood that timer 100 may be adjusted to operate solenoids 96 and 98 in accordance with the dose quantity to be dispensed and the convenience of the operator in inserting and removing the discharge nozzle 43 into and out of vials 51.

In all cases, the amounts filled in the vials are highly accurate and uniform, and the apparatus operates with such reliability that the necessity for inspecting the filled bottles to check their content is largely eliminated.

We claim:

1. In apparatus for dispensing liquid material, a housing having circuit-defining passages therein forming a substantially closed circuit, an intake passage communicating thereinto, means for positively moving liquid material continuously through said circuit in a constant unvarying stream, a discharge nozzle associated with said circuit, valve means within said housing operable to divert the stream of material to said nozzle, whereby material is positively discharged through said nozzle, said valve means being also operable to shut off the nozzle and restore the flow of material through said circuit, and electrically actuated means operable to alternately operate said valve means at high speed in timed relation to repetitively effect the discharge of predetermined uniform amounts of material at fixed intervals.

2. In apparatus for dispensing liquid material, a rotary pump comprising a pump body having a chamber therein and intermeshing gears in said chamber, said body having inlet and outlet orifices, a supply conduit connected to the inlet orifice, a by-pass connecting said inlet and outlet orifices whereby the liquid material may be caused to flow continuously at a predetermined speed in the substantially closed circuit formed by said chamber and by-pass, a delivery conduit, a valve member movable alternately to connect the delivery conduit and the by-pass with said outlet orifice, and means for alternately moving said valve member in timed relation to the rate of flow of said liquid to dispense predetermined quantities of said liquid.

3. In an apparatus for dispensing liquid material, a pump comprising a pump body having a chamber therein, inlet and outlet orifices for said chamber and stream-defining passages formed within said body including a by-pass connecting said inlet and outlet orifices, whereby the liquid material may be caused to flow continuously in a positive stream through the substantially closed circuit formed by said chamber and stream-defining passages and by-pass, a discharge nozzle and a conduit thereto having an intake at a point spaced from said by-pass, and an oscillatory ported valve having an oscillatable valve member therein and having a bore in communication with said outlet orifice, said valve being so arranged that at the end of each oscillatory movement of said valve member a port therein opens to one or the other of the by-pass and the discharge nozzle conduit whereby said outlet orifice is alternately connected with the by-pass and with the discharge nozzle.

4. In apparatus for dispensing liquids, a housing including a chamber having inlet and outlet orifices, a by-pass in said housing between the inlet and outlet orifices of said chamber, means within said chamber for causing a continuous positive flow of liquid through said chamber and by-pass, a discharge nozzle, a valve operable to direct the flow of liquid from the chamber alternately to said nozzle and said by-pass, and electrical means including a timer for operating said valve in predetermined timed sequence and for determining the dwell of the valve in nozzle directing position, whereby a predetermined measured amount of the liquid material is discharged through said nozzle at predetermined intervals.

5. Apparatus for the accurate delivery of uniform predetermined amounts of a viscous liquid, comprising a housing, a pump within said housing to provide a continuous positive delivery of a constant unbroken stream of liquid, a delivery nozzle extending from said housing, a confined recirculation circuit formed within the housing leading directly to the intake of the pump, and means including a unitary valve substantially within the housing and associated with said stream and operable to direct the stream alternatively to said recirculation circuit and said discharge nozzle, and means associated with said valve for predetermining the length of periods during which said stream flows to said nozzle.

6. An apparatus for dispensing liquid material, a rotary pump comprising a pump body having a chamber therein and intermeshing gears in said chamber, said body having inlet and outlet passageways formed therein, a supply conduit connected to the inlet passageway, a by-pass passageway in said pump body adapted to interconnect said inlet and outlet passageways whereby the liquid material may be caused to flow continuously at a predetermined speed in the substantially positively closed circuit formed by said chamber and said passageways, a delivery conduit adapted to communicate with said outlet passageway, a unitary valve means within said body including a ported valve member interposed between said by-pass passageway and said delivery conduit, said valve member being movable to one position to open the by-pass passageway and to close the delivery conduit, and to another position to close the by-pass passageway and to open the delivery conduit, and means associated with said valve member for continuously and alternately moving said member from one of said positions to the other at predetermined intervals.

HENRY F. COFFEY.
PHILIP H. LANHAM.

References Cited in the file of this patent

UNITED STATES PATENTS

| Number | Name | Date |
|---|---|---|
| 599,702 | Griswold | Mar. 1, 1898 |
| 1,280,477 | Hopkins | Oct. 1, 1918 |
| 1,710,771 | Gardiner | Apr. 30, 1929 |
| 1,739,787 | Doughty et al. | Dec. 17, 1929 |
| 2,123,156 | Jagoe | July 5, 1938 |
| 2,364,615 | Beckes | Dec. 12, 1944 |
| 2,432,004 | Gray | Dec. 2, 1947 |
| 2,434,771 | Mueller et al. | Jan. 20, 1948 |
| 2,443,146 | Pyles | June 8, 1948 |
| 2,537,266 | Granberg | Jan. 9, 1951 |